Patented Apr. 23, 1940

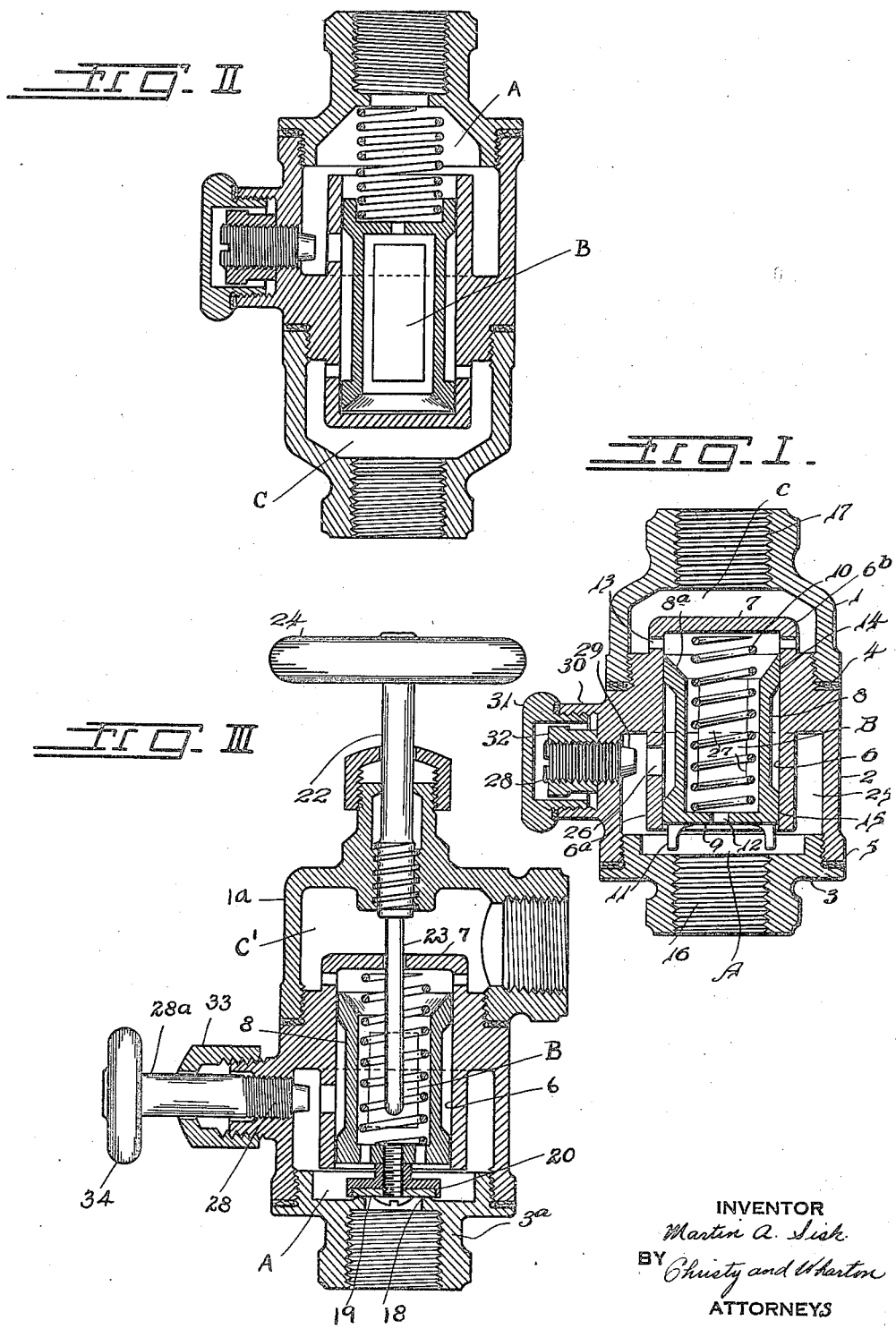

2,198,487

UNITED STATES PATENT OFFICE 2,198,487

AUTOMATIC VALVE

Martin A. Sisk, Pittsburgh, Pa.

Application December 22, 1936, Serial No. 117,111

3 Claims. (Cl. 50—14)

My invention relates to automatic valves, that is, valves for automatically regulating the flow of fluids. The valve of this invention is particularly adapted for regulating the volumetric rate of flow of liquid, and is adapted for installation in, or at either end of, a conduit carrying such fluid.

This application comprises a continuation in part of application Serial No. 630,520, filed by me August 26, 1932, now Patent No. 2,069,022 dated January 26, 1937.

Valves of the sort to which my invention relates are in general known to the art, and it will be understood that my invention consists in specific refinements and simplifications in the construction and organization of the component parts of such valves, by virtue of which greater accuracy of operation is obtained in valves of smaller size and lighter weight. The normal tendency for the controlled fluid to set up harmonic vibrations in the valve and pipe line is effectively inhibited in my structure, whereby the usual vibration eliminators may be dispensed with. Additionally, my structure is such that fine machining of the parts is not essential to accuracy of operation. And provision is made for the ready and minute adjustment of the rate of flow while the valve is in service.

In the accompanying drawing Fig. I is a view of my valve in axial section; Fig. II is a view comparable with Fig. I, illustrating a modified arrangement of the essential elements of the valve; and Fig. III is a sectional view showing still other elaborations and refinements embodied in the valve.

As mentioned above, the valve of this invention is designed particularly for the regulation of hydraulic flow. The valve is responsive to the pressure of the flowing liquid for regulating the volumetric rate of flow, and it will be understood that such regulation of the flow of liquid is required in many fields. For example:

1. In urinals or water-closets provided with the usual flushing valves, the flow of the flushing water depends upon the hydraulic pressure in the water feed line—the flushing valve serving to regulate the quantity of water flowing during each flushing operation, rather than the rate of flow. Depending upon the hydraulic pressure in the feed line, the flow may be so fast as to flood the urinal, or it may be so slow that an adequate flushing is not obtained, and the time required for a flushing operation varies. By including my valve in the water feed line of the urinal, the rate of flow during flushing is maintained at uniform value. Accordingly, the flush valve may be simplified in structure, and may consist simply of a valve adapted to operate periodically, and to stand in open position for a predetermined interval of time during each operation. Since the rate of flow is constant (when the flushing valve is open), the flushing valve need not be concerned with metering the quantity of water flowing, but merely with the time interval in which the valve stands in open position. Additionally, since the rate of flow during flushing is uniform, it becomes possible to design the flushing valve to eliminate the usual noise and vibration during the operation.

2. In the case of the ball-cock valves or float valves of toilet water-closet tanks, my valve may be used with advantage; that is, the flow of water during filling is held at uniform value, whereby it becomes possible to design the equipment to operate without noise.

3. In the case of shower baths my valve is effective to maintain constant the flow of water from the shower-head, whereby the force of the jets flowing from the shower-head is held at adjusted value, regardless of the other demands made upon the water-supplying system while the shower is in operation. As will presently appear, my valve may be adjusted to regulate the rate of flow, in such manner that the force of the jets of water spurting from the shower-head may be regulated to suit the particular person using the shower.

4. My valve may advantageously be embodied in the water feed lines of lavatories or wash-basins, whereby the flow of water on the first floor of a hotel, say, will be substantially the same as on the twentieth floor.

5. By including my valve in a fire hose, conveniently at the nozzle of the hose, or in the water supply line to which the hose is attached, the flow of water is held at constant value, and the usual danger in handling the hose is eliminated. That is to say, sudden changes in the pressure of the water supply, causes a fire hose, as hitherto operated, to twist and squirm violently, in such manner as to endanger the firemen.

6. In instantaneous water heaters, water filters and softeners, lawn sprinklers, and drinking fountains, and the like, the advantages attending the use of my valve are manifest. And it will be understood that the design of my valve lends itself readily to many fields of service.

Referring to Fig. I of the drawing, my valve consists in a body formed of three castings 1, 2 and 3 of metal, machined and threaded, as shown, and united in gasket-sealed joints 4 and 5. The valve structure embodies two outer chambers A and C and an inner or intermediate chamber B. The body portion 2 of the valve includes a cylinder 6 open at its lower end, and closed at its upper end by means of a wall 7 that extends transversely of the axis of the cylinder, and within the cylinder an elongate, hollow plunger 8 is arranged. The plunger 8 is open at its upper end and closed at its lower end, by means of a transverse wall 9. As illustrated in Fig. I, the plunger closes the lower, open end of the cylinder 6, and cooperates with the cylinder in forming the intermediate chamber B. The end wall 7 of the cylinder comprises a stationary partition between the intermediate chamber B and the outer chamber C of the valve, while the transverse wall 9 of the plunger comprises a movable partition between such intermediate chamber B and the outer chamber A. (While the end wall 7 is shown integral with the body 2, it is contemplated that it may be carried by the body portion 1.) Within the cylinder 6 and tubular plunger 8 a compression spring 10 is housed; the spring is effective between the partitions or walls 7 and 9, and tends to shift the plunger 8 downward in the cylinder. As presently will appear, the spring cooperates with the plunger in automatically regulating the flow of liquid through the valve. The plunger 8 carries legs 11 which are adapted to abut against the body portion 3 of the valve and limit the downward movement of the plunger.

The transverse wall 9 of the plunger is provided with an orifice 12 for the passage of liquid between chambers A and B, and the side wall of the cylinder 6 includes a port—in this case several ports 13—for the passage of liquid between chambers B and C. It will be perceived that the plunger 8 engages the walls of cylinder 6 in two regions 14 and 15 of engagement, and, as the plunger rises a greater or less interval from the position in which it is shown in Fig. I, it will be understood that to greater or less degree the upper body portion of the plunger covers the ports 13 from within, and thereby regulates the effective area of the ports. As is also shown in the drawing, the wall of the plunger is tapered or chamfered, as at 8a, providing a relatively sharp edge on the upper end of the plunger for particularly effective cooperation with the ports 13.

In this case the outer chamber A comprises the inlet of the valve, and chamber C the outlet. Threaded openings 16 and 17 are provided for connecting the valve in the pipe line, or to either end of the pipe line or hose, in which the flow of liquid is to be controlled. The liquid whose flow is to be governed enters the chamber A, under line pressure P1, on the supply side of the valve, and flows through passage 12 immediately into chamber B. Under a reduced pressure P2 in chamber B, the liquid flows through ports 13 into the outer chamber C. In flowing from one chamber to another, the effective head or pressure of the liquid drops, so that a decreased pressure P3 is the head under which the liquid is fed from the outlet chamber C.

The differential pressure P1 minus P2 is effective upon the surfaces of transverse wall 9, whose area is the cross-sectional area of the plunger. The force thus effective upon the plunger moves the plunger in axial direction, throttling ports 13, until such force is balanced by the opposed force of spring 10. In thus balancing a force of hydraulic origin (which force varies with flow) against a given mechanical force, the valve will be in stable equilibrium at only one rate of flow.

With the valve in normal equilibrium, and the rate of flow at the normal value, an increase in the differential pressure between inlet chamber A and outlet chamber C (P1 minus P3) produces a momentary increase in flow. Such momentary increase in flow produces a momentary increase in the differential pressure between chambers A and B (P1 minus P2). This increase in differential pressure generates an increased force upon the plunger 8, overbalancing the spring force, and moving the plunger in spring-compressing direction. As before noted, such movement of the plunger throttles the ports 13 and decreases flow. With such decrease in flow there is a resulting decrease in the differential pressure (P1 minus P2) upon the plunger, until the differential pressure is again balanced by spring force, and the movement of the plunger ceases. At this new equilibrium, the differential pressure (P1 minus P2) and the rate of flow regain their former values, and are constantly maintained at such values, with such minor interruptions as are produced by said fluctuations in differential pressure between chambers A and C. Conversely, a decrease in the differential pressure (P1 minus P3) is accompanied by the descent of the plunger, in such manner that the effective area of the ports 13 is increased. This latter action of the valve is opposite to the aforesaid operation produced by an increase in the pressure differential (P1 minus P3), and this reverse operation of the valve also makes for a constant pressure differential (P1 minus P2).

It is important to note that precise machining is not required in the manufacture of my valve. That is, the wall of the cylinder 6 and the side surfaces of the plunger may be machined for relatively loose fit, say with a tolerance of several thousandths of an inch. Compensation for such by-passing flow of water as occurs between the surfaces of the plunger and the cylinder may be made by proper determination of the size of passage 12. This compensation is possible because all liquid passing through the valve necessarily passes through the chamber B whose outlets 13 are subject to automatic flow-controlling regulation.

In refinement, as shown in Fig. III, a valve-seat 18 is provided in the body portion 3a of the structure, and a valve-element 20 is provided on the lower end of the plunger 8. In case of a back surge of water on the delivery side of the valve, or in case of a failure of the water supply at the inlet of the valve, the plunger is immediately moved downward in the cylinder 6, carrying the valve-element 20 to the seat 18, thereby closing the valve against back flow. Thus, my automatic flow-controlling valve may be adapted to serve as a check valve. The upper body portion 1a and the outlet chamber C of the valve may be also modified, and a manually operable valve stem 22 arranged in conventional way in the wall of such body portion, so that rotation of a hand-wheel 24 in either direction of rotation causes the stem to move either inward or outward of the valve structure. The valve stem 22 is provided with a finger 23 that extends downward through the end wall 7 of the cylinder 6 for cooperation with the plunger 8. Normally, the valve stem is adjusted in the position shown in Fig. III, and the valve operates in normal way in automatically regulating flow through the valve, and in providing an automatic check against back flow. If it becomes desirable to stop the flow entirely, the stem 22 is run downward, causing the tip of finger 23 to bear against the bottom wall of the plunger 8, and forcing the plunger downward until the valve member 20 securely engages the valve seat 18. Thus, the valve may be operated as a positive stop valve, as well as a flow-controlling valve and a check valve.

In adapting my valve to particular applications, such as to the feed lines of urinals, showers, lawn sprinklers, fire-hoses, mentioned above, it is frequently desirable to adjust the otherwise constant rate of flow. To such end the body portion 2 of the valve is provided with an annular recess 25 (Fig. I) which in the assembly cooperates with the recessed interior of the body portion 3 in forming the inlet chamber A of the valve. Thus, the partition between the chambers A and B comprises the tubular side wall portion 6a of the cylinder 6 and the end wall 9 of the movable plunger, while the partition between chambers B and C comprises the end wall 7 and side wall portion 6b of the cylinder 6. In the tubular side wall 6a of the cylinder 6, I provide an orifice or port 26, and in the side wall of tubular plunger 8 I form one or more ports or windows 27. Thus it is that water flows in divided stream from the inlet chamber A of the valve into the intermediate chamber B: One component of the stream flows from chamber A through orifice 12 in the bottom of the plunger, and the other flows through port 26 and windows 27 into the chamber B. From chamber B the flow to chamber C occurs in the manner already described, with the upper body portion of the plunger regulating the effective areas of the ports 13 in such manner that a constant volumetric rate of flow is automatically maintained, so long as the effective area of the ports 12 and 26 remains constant.

In accordance with the invention, I provide means for adjusting the flow in one component of the divided stream entering chamber B. Advantageously, I provide a screw 28 with a plug 29 in axial alignment with port 26; the screw is mounted in threaded engagement with the wall of the valve, and, by turning the screw, the position of plug 29 may be adjusted with respect to port 26. The plug may be run in to close the port 26 completely, or it may be adjusted in various positions outward of such port-closing position, whereby the effective area of the port or passage 26 and the flow of liquid therethrough may be minutely regulated. Indeed, the plug 29 is slightly tapered, as shown, to increase the delicacy of adjustment. By such means, the operation of the valve may be modified, to give within certain limits the desired volumetric rate of flow.

In Fig. I the outer end of the screw 28 is shown as housed within a boss 30 and a sleeve-nut 31. In making an adjustment, the sleeve-nut 31 is removed, and a screw-driver is used on the kerfed end of the screw. A lock-nut 32 is provided to lock the screw in adjusted position. Alternately, the screw 28 may be continued in an unthreaded shank 28a, as shown in Fig. III, extending through a packing nut 33, and provided with a handle 34. The latter structure admits of more ready adjustment while the valve is in service.

In Fig. II, I illustrate certain obvious modifications and reversal of parts that adapt the structure for operation, in which the chamber C serves as the inlet chamber and the chamber A the outlet chamber of the valve. Still other modifications may be made without departing from the spirit of the invention.

I claim as my invention:

1. An automatic flow-controlling valve having a body forming a cylinder, a transverse wall therein forming a stationary partition, a plunger therein provided with a transverse wall forming a movable partition, said partitions cooperating with said cylinder to form in the valve body an inlet chamber, an outlet chamber, and an intermediate chamber, said movable partition including a passage for flow between the inlet and intermediate chambers, a passage in said body forming an auxiliary passage for flow from said inlet chamber, manually adjustable means for regulating the effective area of said auxiliary passage, the side wall of said cylinder including a port opening from the intermediate chamber into the outlet chamber, said movable plunger engaging the said wall of said cylinder in two regions spaced apart axially of the plunger and providing between the wall of the cylinder and the body of the plunger a clearance communicating with said auxiliary passage, a passage through said plunger providing for the flow of liquid from said clearance to said intermediate chamber, yielding means cooperating with said plunger, said yielding means and said plunger responding to variations in differential pressure between said chambers, whereby said plunger in one of said regions of engagement with the side wall of said cylinder automatically regulates the effective area of said port in such wall.

2. An automatic flow-controlling valve having a body forming a cylinder, a transverse wall therein forming a stationary partition, a plunger therein provided with a transverse wall forming a movable partition, said partitions cooperating with said cylinder to form in the valve body an intermediate chamber and two chambers external thereto, the side wall of said cylinder including a port opening from said intermediate chamber to one of said external chambers, a passage for flow between said intermediate chamber and the other of said external chambers, manually adjustable means for regulating the effective area of the last-mentioned passage, said movable plunger engaging the side wall of said cylinder in two regions spaced apart axially of the cylinder and providing between the wall of the cylinder and the body of the plunger a clearance establishing communication between said last passage and said intermediate chamber, yielding means cooperating with said plunger, said yielding means and said plunger responding to variations in differential pressure between said chambers, whereby said plunger in one of said regions of engagement with the side wall of said cylinder automatically regulates the effective area of said port in such wall.

3. An automatic flow-controlling valve having a body forming a cylinder, a transverse wall therein forming a stationary partition, a plunger therein provided with a transverse wall forming a movable partition, said partitions cooperating with said cylinder to form in the valve body an intermediate chamber and two chambers external thereto, the side wall of said cylinder including a port opening from said intermediate chamber to one of said external chambers, said movable partition including a passage for flow between said intermediate chamber and the other external chamber, an auxiliary port in said valve body opening from said last-mentioned chamber into said cylinder, manually adjustable means for regulating the effective area of said auxiliary port, a passage establishing communication between said intermediate chamber and said auxiliary port, yielding means cooperating with said plunger, said yielding means and said plunger responding to variations in differential pressure between said chambers, whereby the body of said plunger, making contact with the side wall of said cylinder, automatically regulates the effective area of said first port.

MARTIN A. SISK.